ROBERT J. EHRET
INVENTOR.

BY *Fleshi and Swain*

ATTORNEYS 3,007,103
Patented Oct. 31, 1961

3,007,103
CONVERTER
Robert J. Ehret, Los Altos, Calif., assignor to Ampex Corporation, Redwood City, Calif., a corporation of California
Filed Jan. 30, 1959, Ser. No. 790,185
2 Claims. (Cl. 321—45)

This invention relates generally to a converter and more particularly to a transistorized converter.

One form of a mechanical converter employs a pair of contacts which are alternately closed. There is no voltage across the contact or current flowing through the open contact. Where transistors are employed as switches, there is some voltage across the transistor that is turned on and a current through the one that is turned off. Because of this, vacuum tube and transistor converters are not suitable in many low level applications.

It is general object of the present invention to provide a transistorized converter suitable for use with low and high level signals.

It is another object of the present invention to provide a transistorized balanced converter in which a pair of transistors is connected in a complementary symmetrical configuration.

It is a further object of the present invention to provide a transistorized converter in which the effects of leakage voltage and currents are substantially reduced.

These and other objects of the invention will become more clearly apparent from the following description when taken in conjunction with the accompanying drawings.

Referring to the drawings:

FIGURE 3 shows a simplified circuit illustrating the effects of leakage when the lower transistor is on;

FIGURE 4 shows a simplified circuit illustrating the effects of leakage when the upper transistor is on.

Figure 1:
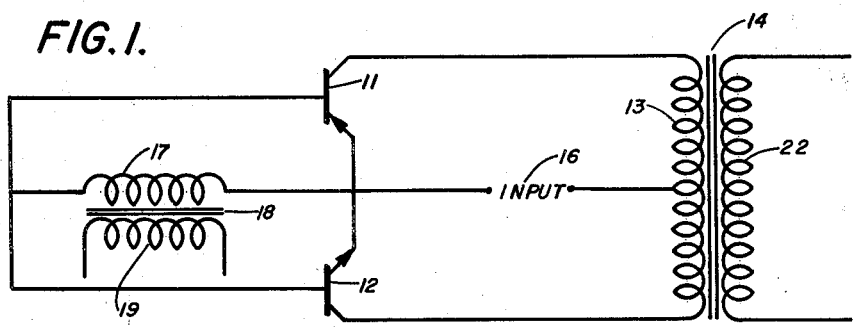
FIGURE 1 shows one embodiment of my invention.
Figure 2:
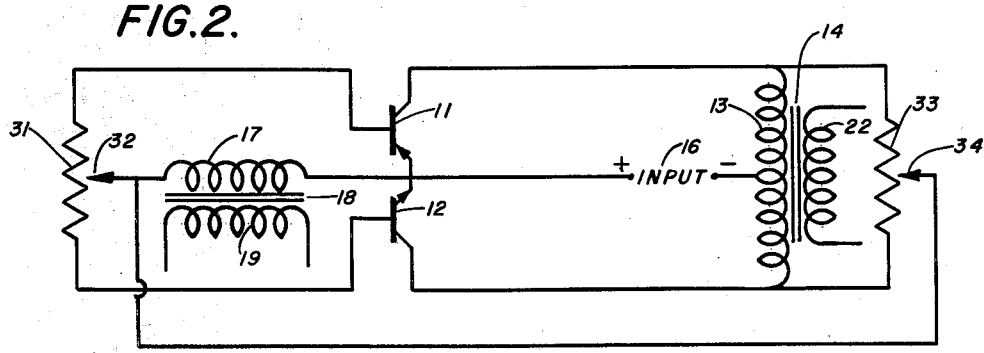
FIGURE 2 shows another embodiment of the invention including means for balancing the circuit.

The converter of FIGURE 1 includes a pair of transistors 11 and 12, which are of opposite conductivity types, that is, which are p–n–p and n–p–n types, respectively. The emitters are connected together. The collectors are connected to opposite ends of the primary winding 13 of the transformer 14. The input signal to be converted is applied to the terminals 16 connected between the emitters and the center tap of the primary 13 of transformer 14. The bases of the transistors are interconnected. A suitable alternating voltage is applied between the emitters and bases through the secondary 17 of the transformer 18. The primary winding 19 of the transformer 18 is excited by a suitable alternating current source. The alternating current signal provides bias between emitters and bases which causes the transistors to alternately be turned on and cut off. When the transistor 11 is turned on, a path is completed for the input signal through the upper half of winding 13. Current flows and a voltage is induced in the secondary 22. When the lower transistor is turned on, a voltage of opposite polarity is induced in the winding 22. Thus, there is formed an alternating output voltage which is proportional to the D.-C. input signal 16 and which has a frequency corresponding to the frequency of the voltage source which excites the winding 19.

Figure 3:
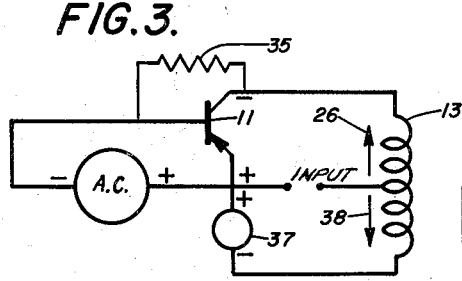

As previously described, the transistors 11 and 12 will have a voltage drop from the emitter to the collector when in the "on" condition, and a current flowing when in the "off" condition. Referring to FIGURE 3 which shows transistor 12 "on" and 11 "off," the voltage across 12 is denoted by generator 37 and the leakage current through 11 is represented by resistor 35. Leakage current 35 gives rise to the current 26 and the leakage voltage 37 gives rise to current 38. It can be seen that these two effects tend to cancel, although they will probably not cancel completely.

Figure 4:
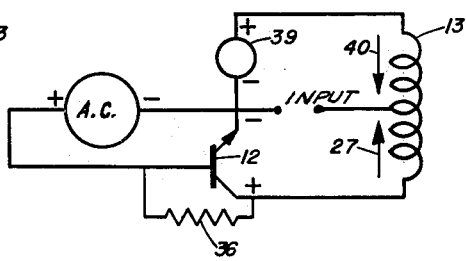

FIGURE 4 illustrates the situation which occurs during the other half cycle. Resistor 36 represents the leakage current of the "off" transistor, and generator 39 the voltage across the "on" transistor. Leakage current 36 gives rise to a current 27, and the leakage voltage 39 to a current 40. The corresponding leakage currents are of such a polarity in the output transformer winding 13 that they tend to cancel one another. In both examples, if the currents do not cancel they tend to cause a signal of timed exciting frequency to appear in the output.

Balance is obtained by proper adjustment of two potentiometers 31 and 33. Potentiometer 31 provides a means of balancing the voltage drops occurring across the transistors when in the "on" state. This balance is achieved by adjusting the relative currents to the bases of the transistors 11 and 12. This balance is effective to the extent that the "on" voltage across the transistors depends upon the base current. Adjustment of tap or slider 32 is made with the input 16 short circuited. Tap or slider 32 is in the balanced position for no net voltage in winding 13 at the signal frequency.

Figure 5:
FIGURE 5 shows the waveform of a typical leakage voltage or current.

The effect of leakage currents in the "off" transistor can be compensated by adjustment of potentiometer 33. This potentiometer applies a current to the winding 13 from the winding 17. The resultant current flowing in winding 13 will be similar in effect to leakage currents of the "off" transistor. When the tap or slider 34 is adjusted in the middle of the potentiometer 33, the effects will be equal for both halves of the cycle. As a result, the output signal will have a frequency twice that of the carrier. Movement of the tap or slider 34 will cause an unbalance of the two pulses and will provide a net signal at carrier frequency. This signal will appear as shown in FIGURE 5. It can be seen that this effect is similar to leakage of the "off" transistor.

It should be apparent that although a common emitter configuration, the invention is also applicable to a common collector configuration for the transistors 11 and 12.

Thus, it is seen that there is provided a converter which employs a pair of transistors connected in a complementary symmetrical configuration whereby leakage currents and voltages are reduced. Effects of similar leakage voltage or current appearing at the output are two times the exciting frequency whereby it may be easily filtered out.

I claim:

1. A converter comprising: a pair of transistors of opposite conductivity type, each having a base, emitter, and collector with the respective emitters connected together; a first potentiometer connected between the respective bases; an output transformer having a center tapped winding connected between the respective collectors; a second potentiometer connected in parallel with the center tapped winding with the adjustable arm connected to the adjustable arm of said first potentiometer; means for applying an input signal to be converted between the center tap of said winding and the respective emitters; and means for applying a control signal between the respective emitters and the adjustable arm of said first potentiometer.

2. A converter as set forth in claim 1, wherein said input signal to be converted is a direct current signal, and said control signal is an alternating current signal for alternately rendering said pair of transistors conductive and nonconductive.

References Cited in the file of this patent

UNITED STATES PATENTS

| | | |
|---|---|---|
| 2,783,384 | Bright et al. | Feb. 26, 1957 |
| 2,826,731 | Paynter | Mar. 11, 1958 |
| 2,827,611 | Beck | Mar. 18, 1958 |
| 2,849,614 | Royer et al. | Aug. 26, 1958 |
| 2,862,171 | Freeborn | Nov. 25, 1958 |
| 2,931,986 | Ensink et al. | Apr. 5, 1960 |